(12) United States Patent
Chen et al.

(10) Patent No.: US 9,197,393 B2
(45) Date of Patent: Nov. 24, 2015

(54) MULTI-TRANSCEIVER WIRELESS COMMUNICATION DEVICE AND METHODS FOR ADAPTIVE MULTI-BAND COMMUNICATION

(71) Applicants: Huimin Chen, Portland, OR (US); Christopher Hull, Portland, OR (US); Thomas A. Tetzlaff, Portland, OK (US)

(72) Inventors: Huimin Chen, Portland, OR (US); Christopher Hull, Portland, OR (US); Thomas A. Tetzlaff, Portland, OK (US)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 13/686,551

(22) Filed: Nov. 27, 2012

(65) Prior Publication Data

US 2014/0146716 A1     May 29, 2014

(51) Int. Cl.
*H04L 5/16*     (2006.01)

(52) U.S. Cl.
CPC ........................................ *H04L 5/16* (2013.01)

(58) Field of Classification Search
CPC ................................... H04L 5/14; H04L 5/16
USPC .................................................. 370/276, 277
See application file for complete search history.

(56) References Cited

U.S. PATENT DOCUMENTS

| | | | |
|---|---|---|---|
| 6,665,276 | B1 | 12/2003 | Culbertson et al. |
| 2003/0017833 | A1* | 1/2003 | Forrester ...................... 455/456 |
| 2003/0203743 | A1* | 10/2003 | Sugar et al. ................ 455/550.1 |
| 2005/0227631 | A1* | 10/2005 | Robinett ......................... 455/83 |
| 2006/0009177 | A1* | 1/2006 | Persico et al. ................ 455/143 |
| 2006/0025165 | A1 | 2/2006 | Tillet et al. |
| 2007/0049213 | A1* | 3/2007 | Tran ................................ 455/78 |
| 2007/0140255 | A1* | 6/2007 | Gautier et al. ............. 370/395.5 |

(Continued)

FOREIGN PATENT DOCUMENTS

| | | |
|---|---|---|
| EP | 1433338 B1 | 2/2006 |
| EP | 2320579 A2 | 5/2011 |
| WO | WO-2014084902 A1 | 6/2014 |

OTHER PUBLICATIONS

"International Application Serial No. PCT/US2013/044110, International Search Report mailed Aug. 27, 2013", 3 pgs.

(Continued)

*Primary Examiner* — Paul H Masur
*Assistant Examiner* — Kabir Jahangir
(74) *Attorney, Agent, or Firm* — Schwegman Lundberg & Woessner, P.A.

(57) ABSTRACT

Embodiments of a multi-transceiver wireless communication device and methods for adaptive multi-band communication are generally described herein. In some embodiments, the multi-transceiver wireless communication device is configurable for half-duplex operation and for asymmetrical full-duplex operation on two non-interfering channels. In some embodiments, a contention-based channel access procedure may be performed to attempt to gain access to both a primary channel and an auxiliary channel. A primary transceiver and an auxiliary transceiver may be configured for asymmetrical full-duplex operation when access to both the primary channel and the auxiliary channel is granted. One of the transceivers may be configured for half-duplex operation when access to only one of the channels is granted. During asymmetrical full-duplex operation, the primary transceiver may be configured to communicate data packets using the primary channel, and the auxiliary transceiver may be configured to communicate control packets using an auxiliary channel.

20 Claims, 1 Drawing Sheet

(56) References Cited

U.S. PATENT DOCUMENTS

| | | | |
|---|---|---|---|
| 2009/0296609 A1 | 12/2009 | Choi et al. | |
| 2013/0083704 A1* | 4/2013 | Gaal et al. | 370/277 |
| 2013/0301487 A1* | 11/2013 | Khandani | 370/278 |
| 2014/0016516 A1* | 1/2014 | Aggarwal et al. | 370/278 |
| 2014/0078940 A1* | 3/2014 | Aggarwal et al. | 370/278 |
| 2014/0146715 A1* | 5/2014 | Aggarwal et al. | 370/276 |

OTHER PUBLICATIONS

"International Application Serial No. PCT/US2013/044110, Written Opinion mailed Aug. 27, 2013", 5 pgs.

"Part 11: Wireless LAN Medium Access Control (MAC) and Physical Layer (PHY) Specifications", IEEE Standards Association, IEEE Computer Society, Std 802.11-2012, Local and metropolitan area networks, (Mar. 29, 2012), 2973 pgs.

"Part 11: Wireless LAN Medium Access Control (MAC) and Physical Layer (PHY) Specifications: Amendment 5: Enhancements for Higher Throughput", IEEE Computer Society, Std. 802.11n-2009, Local and metropolitan area networks, (Oct. 29, 2009), 536 pgs.

"International Application Serial No. PCT/US2013/044110, International Preliminary Report on Patentability mailed Jun. 11, 2015", 7 pgs.

* cited by examiner

MULTI-TRANSCEIVER WIRELESS COMMUNICATION DEVICE AND METHODS FOR ADAPTIVE MULTI-BAND COMMUNICATION

TECHNICAL HELD

Embodiments pertain to wireless communications. Some embodiments relate to wireless networks including wireless networks that operate in accordance with one or more of the IEEE 802.11 family of standards.

BACKGROUND

One issue with communicating data wirelessly is the efficient use of the wireless channel. Some wireless communication protocols, such those of the IEEE 802.111 standards, communicate both data and control packets on the same channel. In the case of certain control packets, such as acknowledge (ACK) packets, the transceiver, for example, needs to switch modes (e.g., from receive (RX) mode to transmit (TX) mode) to communicate ACK packets. This mode switching results in delay due to, among other things, transceiver reconfiguration.

Thus, there are general needs for wireless communication devices and methods that provide improved throughput including increased peak-to-average throughput and reduced transport latency.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Two performance criteria for wireless communications are peak-to-average throughput, which may be measured by the throughput of a radio during data transfer, over the average throughput over a period of time; and transport latency, which may be measured by delay from a packet being transferred to it being received without bit errors. Today's wireless communications based on an IEEE 802.11 protocol operate in half-duplex mode. The radios operated on either side of the ports take turns for transmit and receive. When a radio switches from transmit (TX) to receive (RX) mode, or vice versa, extensive delay is incurred to reconfigure and retrain the radio circuitry for bit and symbol lock. Additionally, extra power consumption may be anticipated in order to switch between the two operation modes. In earlier wireless protocols, such as the IEEE 802.11a/b/g protocols, each data packet required an explicit acknowledgment. Thus for each data packet transferred, the radios on each side would need to switch between TX mode to RX mode, greatly compromising the average throughput. To address this issue, improvement was made at the protocol level to allow for block acknowledgment (BA) in which one block acknowledgment is used for an aggregated number of data packets being continuously transmitted. Although block acknowledgement procedures reduced the number of turnaround events and effectively improved the average throughput, the advantages to block acknowledgement operations are limited since they require extra TX packet buffering in case re-transmission is needed when the packet is corrupted. This introduces extra latency, which is proportional to the number of the aggregated packets. Additionally, a power penalty may also be incurred due to radio re-configuration and training. As can be appreciated, due to the inherent delay associated with half-duplex operation, any further improvement in peak throughput will not yield an effective return on average throughput improvement.

Figure 1:
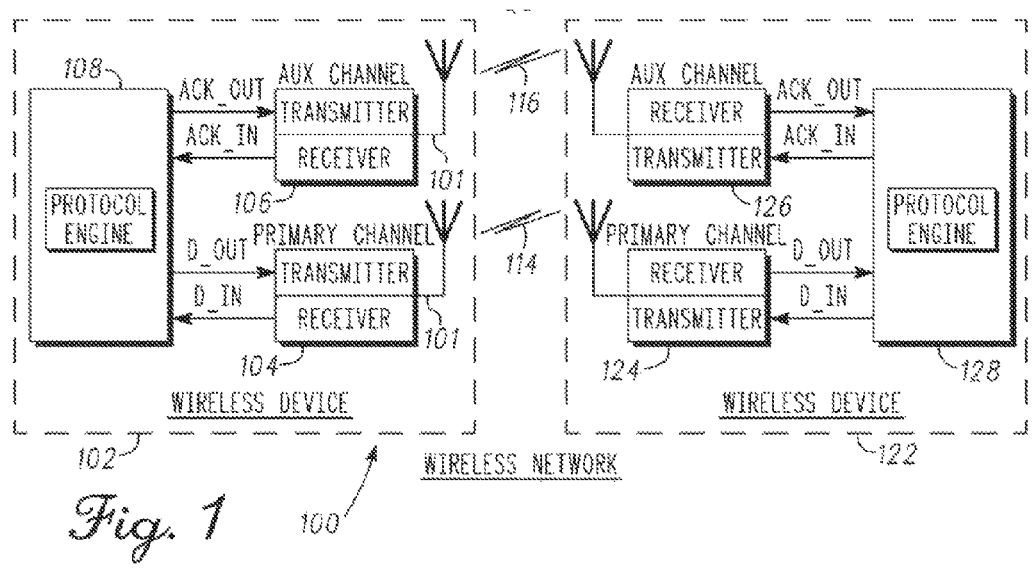
FIG. 1 illustrates a wireless communication network, in accordance with some embodiments.

FIG. 1 illustrates a wireless communication network, in accordance with some embodiments. Wireless communication network 100 includes wireless communication device 102 and one or more other wireless communication devices, such as other wireless communication device 122. Wireless communication devices 102 and 122 may communicate with each other in accordance with one or more wireless communication standards, such as the standards of the IEEE 802.11 family of standards.

In accordance with embodiments, wireless communication device 102 is configurable for half-duplex operation and configurable for asymmetrical full-duplex operation on two or more non-interfering channels. The non-interfering channels may be IEEE 802.11 channels as described in more detail below, although this is not a requirement.

In accordance with embodiments, wireless communication device 102 may include a primary transceiver 104 that is configurable for higher-throughput operation and an auxiliary transceiver 106 that is configurable for lower-throughput operation. Wireless communication device 102 may also include a media-access control (MAC) layer 108 to coordinate channel access and the operations of the primary and auxiliary transceivers (104 and 106). During asymmetrical full-duplex operation, the MAC layer 108 may configure the primary transceiver 104 to communicate (e.g., transmit and/or receive) data packets with other wireless communication device 122 using a primary channel 114, and the MAC layer 108 may configure the auxiliary transceiver 106 to communicate (e.g., receive and/or transmit) control packets using an auxiliary channel 116. These embodiments are described in more detail below. During half-duplex operation, the MAC layer 108 may independently configure at least one of the transceivers to communicate both data packets and control packets with wireless communication device 122 on a same channel.

In these embodiments, during asymmetrical full-duplex operation, the primary transceiver 104 may be configured for higher throughput operations than the auxiliary transceiver 106. Furthermore, during asymmetrical full-duplex operation, the auxiliary transceiver 106 may be configured for lower throughput operations than the primary transceiver 104. As explained in more detail below, an asymmetrical full-duplex operation may make more efficient use of the wireless medium to achieve a higher throughput.

In some embodiments, the MAC layer 108 of wireless communication device 102 (as well as the MAC layer 128 of the other wireless communication device 122) may include a protocol engine configured for implementing a particular protocol, such as one or more of the IEEE 802.11 protocols.

As discussed in more detail below, during asymmetrical full-duplex operation, an asymmetrical full-duplex communication link may be constructed between wireless communication device 102 and other wireless communication device 122 within a predefined grant period. The asymmetrical full-duplex communication link may comprise primary channel 114 for data transfer and auxiliary channel 116 for control information transfer.

Other wireless communication device 122 may also be configurable for half-duplex operation and for asymmetrical full-duplex operation on two or more non-interfering channels. In these embodiments, other wireless communication device 122 may include a primary transceiver 124 that is configurable for higher-throughput operation and an auxiliary transceiver 126 that is configurable for lower-throughput operation. Other wireless communication device 122 may also include a MAC layer 128 to coordinate channel access and the operations of the primary and auxiliary transceivers (124 and 126).

Wireless communication network 100 may also include other wireless communication devices that may not necessarily be configurable for asymmetrical full-duplex operation on two or more non-interfering channels.

In some embodiments, during asymmetrical full-duplex operation, the MAC layer 108 may coordinate the operations of the primary transceiver 104 and the auxiliary transceiver 106, route the data packets to and from the primary transceiver 104, and route the control packets from and to the auxiliary transceiver 106. During asymmetrical full-duplex operation, the auxiliary transceiver 106 may be configured to operate at a lower transmit power level than the primary transceiver 104 and/or utilize a narrower bandwidth than the primary transceiver 104. Accordingly, during asymmetrical full-duplex operation, the primary transceiver 104 may be configured for higher throughput than the auxiliary transceiver 106 (i.e., unequal throughputs).

In some of these embodiments, the primary channel 114 may be established using the primary transceiver 104 as a data channel, and the auxiliary channel 116 may be established with the auxiliary transceiver 106 as a control channel. According y, when receiving data packets, the primary transceiver 104 does not need to switch from receive (RX) mode to transmit (TX) mode in order to transmit acknowledge (ACK) packets since the auxiliary transmitter 106 is configured to transmit the ACK packets. Likewise when transmitting data, the primary transceiver 104 does not need to switch from TX mode to RX mode to receive ACK packets since the auxiliary transmitter 106 is configured to receive the ACK packets. Accordingly, improved throughput including increased peak-to-average throughput and reduced transport latency may be achieved.

During asymmetrical full-duplex operation without the need for the primary transceiver 104 to switch between transmitting and receiving modes, data packets may be transmitted continuously during the grant period allowing the throughput to approach the peak attainable throughput of the channel while at the same time minimizing the transfer latency for a better quality-of-service (QoS). Furthermore, asymmetrical full-duplex operation on two non-interfering channels allows for ease of implementation and may be applicable to many communication usage scenarios in which throughput is highly asymmetrical (e.g., one-way file transfer, video streaming, etc.). Some embodiments may be able to co-exist with the existing and future IEEE 802.11 infrastructure.

In accordance with embodiments, either or both wireless communication devices 102 and 122 may operate as an end point (EP) or an access point (AP). The association between wireless communication device 102 and other wireless communication device 122 may be in a peer-to-peer (P2P) mode in which both wireless communication devices 102 and 122 operate as end points. The association between wireless communication device 102 and other wireless communication device 122 may alternatively be in infrastructure mode in which one of the devices operates as an end point and the other operates as an access point.

In some embodiments, wireless communication device 102 may provide instructions to other wireless communication device 122 to indicate asymmetrical full-duplex operation. In this way, the MAC layer 128 of the other communication device 122 can configure itself for asymmetrical full-duplex operation to allow communication of data over the primary channel 114 and communication of control information over the auxiliary channel 116 for improved throughput.

In some embodiments, when access to both channels is granted by other wireless communication device 122, wireless communication device 102 may send a control message to other wireless communication device 122 through one of the channels (primary channel 114 and/or auxiliary channel 116) to request asymmetrical full-duplex operation. In some embodiments, the control message may indicate the channel configuration information (e.g., which channel is to operate as the auxiliary channel 116 and which channel is to operate as the primary channel 114). Upon receiving the control message from wireless communication device 102, other wireless communication device 122 may send an acknowledgement to wireless communication device 102 and may subsequently configure transceivers 124 and 126 for the asymmetrical full-duplex operations requested by the wireless communication device 102.

In some embodiments, during asymmetrical full-duplex operation, the MAC layer 108 configures the primary transceiver 104 to communicate data packets without control packets using the primary channel 114, and the MAC layer 108 configures the auxiliary transceiver 106 to communicate control packets without data packets using an auxiliary channel 116. In some embodiments, during asymmetrical full-duplex operation, only data packets are communicated by the primary transceiver 104 on the primary channel 114, and only control packets are communicated by the auxiliary transceiver 106 on the auxiliary channel 116.

In some embodiments, the control packets may comprise acknowledge (ACK) packets, although the scope of the embodiments is not limited in this respect. During the asymmetrical full-duplex operation, the MAC layer 108 may configure the primary transceiver 104 to transmit data packets over the primary channel 114, and the MAC layer 108 may configure the auxiliary transceiver 106 to receive ACK packets over the secondary channel 116. The ACK packets may acknowledge receipt of the data packets by another wireless communication device 122.

In some embodiments, the other wireless communication device 122 may be a wireless display device, although the scope of the embodiments is not limited in this respect. In some of these embodiments, the wireless communication device 102 may send, for example, high-definition (HD) video and multi-channel surround sound to the display device during asymmetrical full-duplex operation. In some embodiments, the wireless display device may be configured in accordance with the Wireless Display (WiDi) standard, although this is not a requirement. The use of asymmetrical full-duplex operation may also be applicable to other low-latency high-throughput applications such as cloud computing and one-way data and one-way file transfer.

In some embodiments for receipt of data, during the asymmetrical full-duplex operation, the MAC layer 108 may configure the primary transceiver 104 to receive data packets over the primary channel 114. The MAC layer 108 may configure the auxiliary transceiver 106 to transmit ACK packets over the auxiliary channel 116 to acknowledge receipt of the data packets by the wireless communication device 102.

In some two-way data transfer and two-way file transfer embodiments, during the asymmetrical full-duplex operation, the MAC layer 108 may configure the (primary transceiver 104 to receive data packets over the primary channel 114 and may configure the auxiliary transceiver 106 to transmit ACK packets over the auxiliary channel 116 to acknowledge receipt of the data packets that were sent by the other wireless communication device 122. Furthermore, the MAC layer 108 may configure the primary transceiver 104 to transmit data packets over the primary channel 114 and may configure the auxiliary transceiver 106 to receive ACK packets over the auxiliary channel 116. The received ACK packets may acknowledge receipt of the data packets by the other wireless communication device 122. In some of these embodiments, the same primary channel may be used to transmit and receive data, although this is not a requirement. In some other embodiments, a first primary channel may be used to transmit data packets while a second primary channel may be used to receive data packets. The first and second primary channels may be non-interfering channels. In both of these scenarios, a single auxiliary channel, such as auxiliary channel 116, may be used to both send and receive control packets, such as ACK, packets.

In some embodiments, the half-duplex operation comprises either a dual-transceiver half-duplex operation or a single-transceiver half-duplex operation. During dual-transceiver half-duplex operation, the MAC layer 108 may independently configure the primary transceiver 104 to communicate both data packets and control packets on the primary channel 114. The MAC layer 108 may independently configure the auxiliary transceiver 106 to communicate both data packets and control packets on the auxiliary channel 116. During the single-transceiver half-duplex operation, the MAC layer 108 may independently configure either the primary transceiver 104 to communicate both data packets and control packets on the primary channel 114 or the auxiliary transceiver 106 to communicate both data packets and control packets on the auxiliary channel 116.

During dual-transceiver half-duplex operations, both transceivers may be configured to operate independently, while the operations of both the transceivers may be coordinated by MAC layer 108 during asymmetrical full-duplex operation. In some embodiments, during dual-transceiver half duplex operations (i.e., when both the primary and the auxiliary transceivers operate independently), the auxiliary transceiver 106 may also operate at a higher throughput for the communication of both data and control packets, although the scope of the embodiments is not limited in this respect as the auxiliary transceiver 106 may operate at a lower throughput for the communication of both data and control packets during the dual-transceiver half-duplex operation.

In some embodiments, when access to both channels is granted, dual-transceiver half-duplex operation may be used when the other wireless communication device does not have the capability to communicate in accordance with asymmetrical full-duplex operation. In some embodiments, dual-transceiver half-duplex operation or single-transceiver half-duplex operation may be used when the amount of data that is to be transferred is not sufficient to significantly benefit from asymmetrical full-duplex operation, although the scope of the embodiments is not limited in this respect.

In some embodiments, the other wireless communication device 122 may respond to a request for asymmetrical full-duplex operation and indicate that it has asymmetrical full-duplex operation capability. No response or an improper response may indicate that the other wireless communication device 122 does not have asymmetrical full-duplex operation capability.

In some embodiments, the MAC layer 108 may be configured to perform a contention-based channel access procedure to attempt to gain access to both a first channel and a second channel. The first and second channels may be within non-interfering channels, either of which could become the primary channel 114 or the auxiliary channel 116. In these embodiments, when access to both the first and the second channels is granted, the MAC layer 108 may configure the (primary transceiver 104 and the auxiliary transceiver 106 for asymmetrical full-duplex operation. When access to only one of the first and the second channels is granted, the MAC layer 108 may configure one of the transceivers for half-duplex operation.

In some embodiments, the MAC layer 108 may configure the (primary transceiver 104 to perform the contention-based channel access procedure to gain access to the first channel. The MAC layer 108 may configure the auxiliary transceiver 106 to perform a contention-based channel access procedure to gain access to the second channel.

In some embodiments, the MAC layer 108 may be configured to perform a contention-based channel access procedure on the auxiliary channel 116 to gain access to both the primary channel 114 and the auxiliary channel 116. In these embodiments, a contention-based channel access procedure is not performed on the primary channel 114. In these embodiments, the primary channel 114 may be used only for data transfer, and the auxiliary channel 116 may be used for control information.

In some embodiments, when wireless communication device 102 needs a file transfer, the MAC layer 108 may direct both the primary transceiver 104 and the auxiliary transceiver 106 to request channel access to both the primary channel 114 and the auxiliary channel 116. If other wireless communication device 122 grants wireless communication device 102 access to both channels 114 and 116, an asymmetrical full-duplex communication link may be constructed between wireless communication device 102 and other wireless communication device 122 within a grant period. When access to only one channel is granted by wireless communication device 122, a half-duplex communication link may be constructed between wireless communication device 102 and wireless communication device 122 within the grant period. If, at the end of the grant period, the file transfer has not completed, MAC layer 108 of wireless communication device 102 may again request access to both the primary channel 114 and the auxiliary channel 116 for subsequent construction of either an asymmetrical full-duplex communication link or a half-duplex communication link for use in completion of the file transfer. The grant period may be predefined and may be in accordance with an IEEE 802.11 specification, although this is not a requirement.

In some embodiments, the contention-based channel access process may, for example, be a carrier sense multiple access with collision detection (CSMA/CD) process, a carrier sense multiple access with collision avoidance (CSMA/CA), or an enhanced distributed coordination function (EDCF) process in accordance with an IEEE 802.11, such as the IEEE 802.11n or the IEEE 802.11e standard. Other channel access procedures may also be used including non-contention based procedures. Some embodiments may be applicable to fully-scheduled networks.

In some embodiments, the contention-based channel access process may be performed over the full bandwidth of one of the channels, although this is not a requirement. After access is granted, the channel that becomes the auxiliary channel 116 may utilize only a portion of such bandwidth. In some embodiments, the channel access process may comprise performing request-to-send (RTS)/clear-to-send (CTS) handshaking (i.e., RTS/CTS handshaking), although the scope of the embodiments is not limited in this respect. In some embodiments, the channel access process (including the communication of control packets such as RTS/CTS packets) may be performed on the auxiliary channel 116 to reserve bandwidth on the primary channel 114 and the auxiliary channel 116.

In some other embodiments, the use of RTS/CTS handshaking may be performed on either the primary or auxiliary channel prior to a longer packet; however for shorter packets, the channel access process may be performed on the auxiliary channel 116.

In some embodiments, a Request-To-Send-Primary and Clear-To-Send-Primary (RTSP/CTSP) may be communicated over the auxiliary channel 116 for the purpose of reserving immediate access to the primary channel 114.

In some of these embodiments, for asymmetrical full-duplex operation, a dual-simplex link may be established such that the primary channel 114 is configured for high-throughput data communication, and the auxiliary channel 116 is configured for low-throughput/low-latency communications (e.g., data acknowledgement). The dual-simple link may be an asymmetrical full-duplex communication link.

In some embodiments, control packets as well as management packets may be communicated over the auxiliary channel 116 during asymmetrical full-duplex operation. In these embodiments, the auxiliary channel 116 may be used for link management messaging. In some embodiments, a full set of ACK-related control packets (e.g., ACK, Block ACK Request, and Block ACK) may be communicated on the auxiliary channel 116. In some embodiments, power-save poll (PS-Poll) and some or all management frames (e.g., probes, association messages, authentication, beacons, etc.) may be communicated over the auxiliary channel 116. In some embodiments, control frames, such as RTSP/CTSP frames or packets, that are used to control access to the primary channel 114 may be communicated over the auxiliary channel 116.

In some embodiments, gaps in channel usage (e.g., due to switching between RX and TX modes) may be minimized and even eliminated. Furthermore, some embodiments may minimize the use of packets having lower modulation and coding schemes (MCS) on the primary channel 114. Low MCS packets may include control and management packets. In these embodiments, the auxiliary channel 116 may be primarily used for low-MCS packets. Accordingly, the primary channel 114 can be used for high data rate (higher MCS) packets with minimum overhead. In some embodiments, the primary channel 114 may be used exclusively for high-rate data frames with a minimal or a reduced inter-frame spacing, although the scope of the embodiments is not limited in this respect.

In some embodiments, when access to both the first and the second channels is granted, the MAC layer 108 may designate one of the available channels as a primary channel 114 and the other of the available channels as an auxiliary channel 116. The MAC layer 108 may evaluate the channel quality and/or the channel availability/occupancy to select the primary channel and the auxiliary channel. In these embodiments, the channel with a higher throughput capability (e.g., a higher quality level (based on signal-to-noise ratio (SNR), noise level, etc.) and/or less busy (un-crowded)) may be designated as the primary channel 114. The channel with the lower throughput capability (e.g., a lower quality level and/or the busier channel) may be designated as the auxiliary channel 116. In some embodiments, the more crowded channel (i.e., the channel with higher channel occupancy) may be selected as the auxiliary channel.

In some embodiments, the MAC layer 108 may be configured to switch between asymmetrical full-duplex operation and half-duplex operation based on channel availability and channel conditions. The channel conditions may include real-time traffic. In these embodiments, the MAC layer 108 may adapt to real-time channel conditions including changes in channel quality as well as changes in channel traffic. For example, if the primary channel becomes too busy, another channel may be selected as the primary channel. For example, after an initial grant period, wireless communication device 102 may perform another contention-based channel access procedure to gain access to both the primary channel 114 and the auxiliary channel 116 for a subsequent grant period. If one of the channels has become unavailable, busy, or has degraded, the MAC layer 108 may switch between asymmetrical full-duplex operation and half-duplex operation.

Furthermore, the MAC layer 108 may switch between asymmetrical full-duplex operation and half-duplex operation when a sudden decrease in the amount of throughput needed by wireless communication device 102 occurs. For example, when a file transfer is completed and lower throughput is needed (e.g., for a low-resolution video stream, etc.), the MAC layer 108 may switch between asymmetrical full-duplex operation and half-duplex operation for a subsequent grant period.

In some embodiments, the auxiliary channel 116 and the primary channel 114 may utilize the same bandwidth, although this is not a requirement. In these embodiments, the auxiliary channel 116 and the primary channel 114 may comprise 20 MHz or larger channels in either the 2.4 GHz or the 5.6 GHz (802.11a/b/g/n/ac) ranges, or 2 GHz channels in the 60 GHz band (802.11ad), although this is not a requirement.

In some embodiments, the auxiliary channel 116 may be configured to utilize a narrower bandwidth than the primary channel 114. In these embodiments, the primary channel 114 may be at least a 20 MHz channel in either the 2.4 GHz or the 5.6 GHz (e.g., in accordance with IEEE 802.1 in and IEEE 802.11ac) ranges or a 2 GHz channels in the 60 GHz band (e.g., in accordance with IEEE 802.11ad). The auxiliary channel 116 may be a narrower channel (e.g., a 2 MHz channel in the sub-GHz band (e.g., in accordance with IEEE 802.11ah) although this is not a requirement).

In some embodiments, the primary channel 114 may be either a 40, 80 or 160 MHz channel (IEEE 802.11ac), and the auxiliary channel may be a 20 MHz channel (e.g., in the 2.4 GHz band). In some of these embodiments, the (primary channel 114 may be compliant with IEEE 802.11ac for high throughput data transfer, and the auxiliary channel 116 may be compliant with IEEE 802.11b for data acknowledgement, although this is not a requirement. Channels other than IEEE 802.11n and IEEE 802.11ac channels may also be used as the primary channel 114 and the auxiliary channel 116.

In some embodiments, the auxiliary channel 116 may be operated at a lower power level than the primary channel 114, which may result in a lower data rate. The lower power level may be a power level determined to be acceptable for communication of low MCS packets, such as control packets, which may have lower QoS requirements than data packets.

In some embodiments, wireless communication device 102 (as well as other wireless communication device 122) may be a portable wireless communication device, such as a personal digital assistant (PDA), a laptop or portable computer with wireless communication capability, a digital display device, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

As illustrated in FIG. 1, wireless communication device 102 (as well as other wireless communication device 122) may include one or more antennas 101. The antennas 101 may comprise one or more directional or omnidirectional antennas, including, for example, dipole antennas, monopole antennas, patch antennas, loop antennas, microstrip antennas or other types of antennas suitable for transmission of RF signals. In some embodiments, a single antenna may be used for primary transceiver 104, and a single antenna may be used for auxiliary transceiver 106. In other embodiments, a plurality of antennas may be used by both transceivers. In some multiple-input multiple-output (MIMO) embodiments, a plurality of antennas 101 may be used at least by the primary transceiver 104 and may be effectively separated to take advantage of spatial diversity and the different channel characteristics that may result between each of antennas 101 and the antennas of a transmitting station. In some MIMO embodiments, antennas 101 may be separated by up to 1/10 of a wavelength or more.

In some embodiments, wireless communication device 102 (as well as other wireless communication device 122) may include one or more of a keyboard, a display, a non-volatile memory port, multiple antennas, a graphics processor, an application processor, speakers, and other mobile device elements. The display may be a liquid-crystal display (LCD) screen including a touch screen.

Although wireless communication devices 102 and 122 are illustrated as having dual transceivers (i.e., primary transceivers 104 and 114 and auxiliary transceivers 106 and 116), the scope of the embodiments is not limited in this respect. In some multi-transceiver embodiments, wireless communication devices 102 and 122, may include additional transceivers for communication concurrently over additional channels.

Although wireless communication devices 102 and 122 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuit for performing at least the functions described herein. In some embodiments, the functional elements of wireless communication devices 102 and 122 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, wireless communication devices 102 and 122 may include one or more processors and may be configured with instructions stored on a computer-readable storage device.

Figure 2:
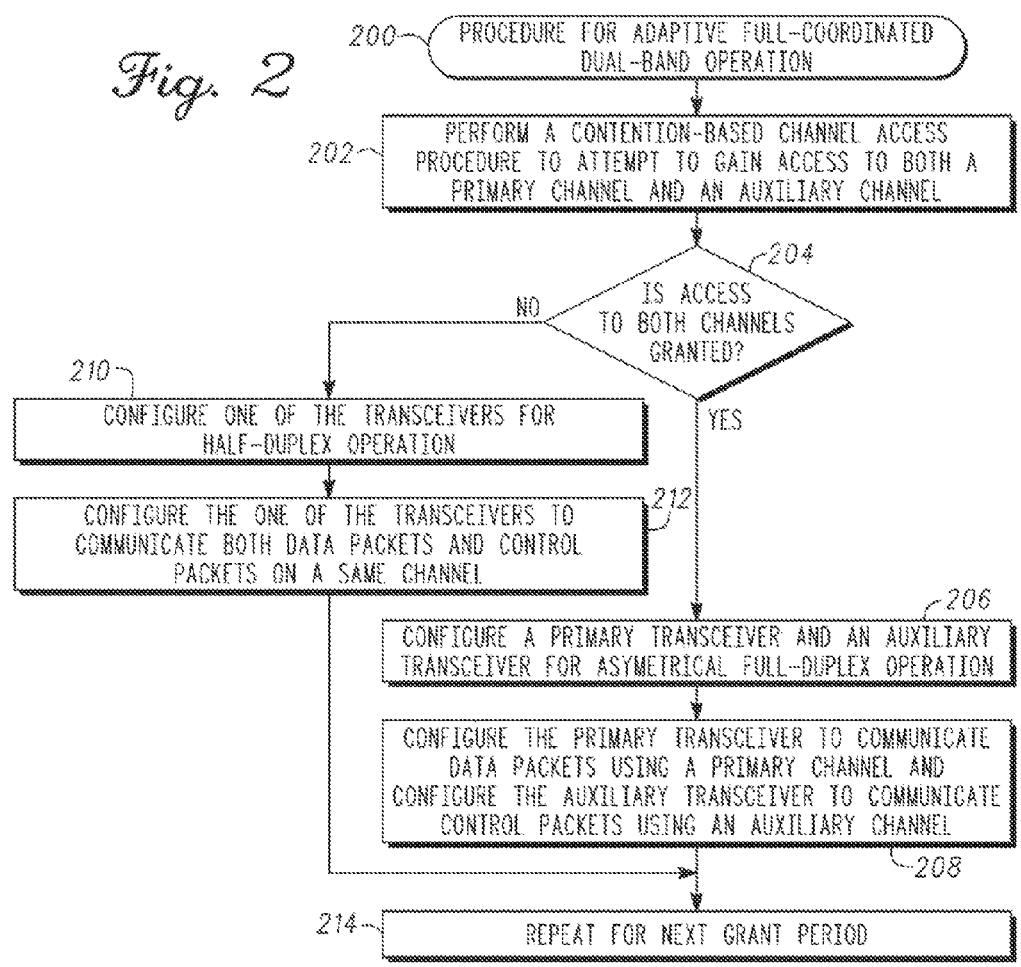
FIG. 2 is a procedure for adaptive fully-coordinated dual-band operation, in accordance with some embodiments.

FIG. 2 is a procedure for adaptive fully-coordinated dual-band operation, in accordance with some embodiments. Procedure 200 may be performed by a wireless communication device, such as wireless communication device 102 (FIG. 1) that is configurable for half-duplex operation and for asymmetrical full-duplex operation on two non-interfering channels.

Operation 202 comprises performing a contention-based channel access procedure to attempt to gain access to both a primary channel and an auxiliary channel. In some embodiments, the channel access procedure for both channels may be performed on the auxiliary channel.

Operation 204 determines whether access has been granted to both channels. If access is granted to both channels, operations 206 and 208 are performed. If access to both channels in not granted and access to one channel is granted, operations 210 and 212 are performed.

Operation 206 comprises configuring a primary transceiver and an auxiliary transceiver for asymmetrical full-duplex operation when access to both the (primary channel and the auxiliary channel is granted.

Operation 208 comprises configuring the primary transceiver to communicate data packets using a primary channel and configuring the auxiliary transceiver to communicate control packets using an auxiliary channel for asymmetrical full-duplex operation. An asymmetrical full-duplex link may be established for the grant period.

Operation 210 comprises configuring one of the transceivers for half-duplex operation when access to only one of the channels is granted.

Operation 212 comprises configuring the transceiver to communicate both data packets and control packets on a same channel for half-duplex operation. A half-duplex link may be established for the grant period.

Operation 214 comprises repeating the operations of procedure 200 for the next grant period.

In some embodiments, a dual-band wireless link is defined that, through a MAC extension to existing 802.11 protocols, may be capable of adaptively operating at full-duplex mode when both radio bands are available or half-duplex mode when only a single radio band is available. Some embodiments may include a single MAC and two radios that are operated under two noninterfering radio frequencies. The main radio may be capable of high peak throughput intended for data transfer. The auxiliary radio may be capable of low data rate intended for control and link management messaging but at very low cost and power consumption. The single MAC may be responsible for management of the two radios at the same time such that it may be capable of dynamically configuring the dual-band wireless link operation in a way that adapts to real-time air traffic. When both radio bands are granted for channel access, a full duplex wireless link may be formed. The MAC may direct the main radio for data transfer and the auxiliary radio for packet acknowledge. This effectively is a dual simplex operation where no radios need to switch between TX mode and RX mode. If, during channel-access procedures (CP), only one of the radio bands is granted with channel access, the MAC may direct the operation in a standard way. If only the auxiliary channel is available, the MAC may decide to use it for data transfer if appropriate, or wait or reserve it, depending on the main radio. Furthermore, the MAC may continue the contention for access to the other radio channel, and if granted, the MAC will dynamically reconfigure the communications and direct the traffic flow. If the previous channel under operation is on main radio, the MAC may route and expect acknowledgement from the auxiliary radio. If the previous radio under operation is on auxiliary radio, the MAC may re-direct the traffic so that data will be transferred in the main radio, and acknowledgement is carried on the auxiliary radio. The same may be true when one of the dual-band radios loses the access to channel, and the MAC may switch to half-duplex communications.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device configurable for half-duplex operation and for asymmetrical full-duplex operation on two non-interfering channels, the wireless communication device comprising:
    a primary transceiver configurable for higher-throughput operation;
    an auxiliary transceiver configurable for lower-throughput operation; and
    a media-access control (MAC) layer to coordinate channel access and operations of the primary and auxiliary transceivers,
    wherein during asymmetrical full-duplex operation, the MAC layer configures the primary transceiver to communicate data packets using a primary channel and configures the auxiliary transceiver to communicate control packets using an auxiliary channel, and
    wherein during half-duplex operation, the MAC layer independently configures at least one of the transceivers to communicate both data packets and control packets on the primary channel.

2. A wireless communication device configurable for half-duplex operation and for asymmetrical full-duplex operation on two non-interfering channels, the wireless communication device comprising:
    a primary transceiver configurable for higher-throughput operation;
    an auxiliary transceiver configurable for lower-throughput operation; and
    a media-access control (MAC) layer to coordinate channel access and operations of the primary and auxiliary transceivers,
    wherein during asymmetrical full-duplex operation, the MAC layer configures the primary transceiver to communicate data packets using a primary channel and configures the auxiliary transceiver to communicate control packets using an auxiliary channel, and
    wherein during half-duplex operation, the MAC layer independently configures at least one of the transceivers to communicate both data packets and control packets on the primary channel,
    wherein during asymmetrical full-duplex operation, the MAC layer is to:
    coordinate operations of the primary transceiver and the auxiliary transceiver;
    route the data packets to and from the primary transceiver; and
    route the control packets from and to the auxiliary transceiver,
    wherein during asymmetrical full-duplex operation, the auxiliary transceiver is configured to at least one of:
    operate at a lower transmit power level than the primary transceiver; or
    utilize a narrower bandwidth than the primary transceiver.

3. The wireless communication device of claim 2, wherein the wireless communication device is to provide instructions to another device to indicate asymmetrical full-duplex operation.

4. The wireless communication device of claim 3, wherein during asymmetrical full-duplex operation, the MAC layer configures the primary transceiver to communicate data packets without control packets using the primary channel, and the MAC layer configures the auxiliary transceiver to communicate control packets without data packets using an auxiliary channel.

5. The wireless communication device of claim 3, wherein the control packets comprise acknowledge (ACK) packets, and
    wherein during the asymmetrical full-duplex operation, the MAC layer configures the primary transceiver to transmit data packets over the primary channel and configures the auxiliary transceiver to receive ACK packets over the secondary channel, the ACK packets to acknowledge receipt of the data packets by another wireless communication device.

6. The wireless communication device of claim 5, wherein the other wireless communication device is a wireless display device.

7. The wireless communication device of claim 3, wherein the control packets comprise acknowledge (ACK) packets, and
    wherein during the asymmetrical full-duplex operation, the MAC layer configures the primary transceiver to receive data packets over the primary channel and configures the auxiliary transceiver to transmit ACK packets over the auxiliary channel to acknowledge receipt of the data packets by the wireless communication device.

8. The wireless communication device of claim 2, wherein the half-duplex operation comprises either dual-transceiver half-duplex operation or single-transceiver half-duplex operation,
    wherein during the dual-transceiver half-duplex operation, the MAC layer independently configures the primary transceiver to communicate both data packets and control packets on the primary channel, and the MAC layer independently configures the auxiliary transceiver to communicate both data packets and control packets on the auxiliary channel, and
    wherein during the single-transceiver half-duplex operation, the MAC layer independently configures either the primary transceiver to communicate both data packets and control packets on the primary channel or the auxiliary transceiver to communicate both data packets and control packets on the auxiliary channel.

9. The wireless communication device of claim 2, wherein the MAC layer is further configured to perform a contention-based channel access procedure on the auxiliary channel to gain access to both the primary channel and the auxiliary channel.

10. The wireless communication device of claim 2, wherein the MAC layer is further configured to:
    perform a contention-based channel access procedure to attempt to gain access to both a first channel and a second channel for a grant period, the first and second channels being within non-interfering channels, wherein when access to both the first and the second channels is granted, the MAC layer is to configure the primary transceiver and the auxiliary transceiver for asymmetrical full-duplex operation, and when access to only one of the first and the second channels is granted, the MAC layer is to configure one of the transceivers for half-duplex operation.

11. The wireless communication device of claim 10, wherein when access to both the first and the second channels is granted, the MAC layer is to designate one of the channels as a primary channel and the other of the channels as an auxiliary channel, and wherein the MAC layer is to evaluate at least one of a channel quality, channel availability, or channel occupancy to select the primary channel and the auxiliary channel.

12. The wireless communication device of claim 10, wherein for each grant period the MAC layer is configured to determine whether to switch between asymmetrical full-duplex operation and half-duplex operation based on channel availability and channel conditions, and wherein the contention-based channel access procedure is repeated for subsequent grant periods to attempt to gain access to both the first channel and the second channel.

13. The wireless communication device of claim 10, wherein the auxiliary channel and the primary channel utilize a same bandwidth, and wherein the busier channel is selected as the auxiliary channel.

14. The wireless communication device of claim 10, wherein the primary channel is at least a 20 MHz channel in either the 2.4 GHz or the 5.6 GHz ranges or a 2 GHz channels in the 60 GHz band, and wherein the auxiliary channel is a 2 MHz channel in the sub-GHz band.

15. The wireless communication device of claim 10, wherein the primary channel is either a 40, 80, or 160 MHz channel, and wherein the auxiliary channel is a 20 MHz channel.

16. A method performed by a wireless communication device that is configurable for half-duplex operation and for asymmetrical full-duplex operation on two non-interfering channels, the method comprising:

configuring a primary transceiver for higher-throughput operation;

configuring an auxiliary transceiver for lower-throughput operation; and coordinating channel access and operations of the primary and auxiliary transceivers with a media-access control (MAC) layer, wherein during asymmetrical full-duplex operation, the MAC layer configures the primary transceiver to communicate data packets using a primary channel and configures the auxiliary transceiver to communicate control packets using an auxiliary channel, and wherein during half-duplex operation, the MAC layer independently configures at least one of the transceivers to communicate both data packets and control packets on the primary channel.

17. The method of claim 16, wherein during asymmetrical full-duplex operation, the method comprises:

coordinating operations of the primary transceiver and the auxiliary transceiver including routing the data packets to and from the primary transceiver, and routing the control packets from and to the auxiliary transceiver; and one or more of:

operating the auxiliary transceiver at a lower transmit power level than the primary transceiver; or utilizing a narrower bandwidth by the auxiliary transceiver than the primary transceiver.

18. A wireless communication system for data transfer comprising:

one or more antennas;

a primary and an auxiliary transceiver coupled to the one or more antennas; and processing circuitry to perform media-access control (MAC) layer operations including performance of a contention-based channel access procedure to attempt to gain access to both a primary channel and an auxiliary channel, the primary channel and the auxiliary channel being within non-interfering channels, wherein the processing circuitry is to configure the primary transceiver and the auxiliary transceiver for asymmetrical full-duplex operation when access to both the primary channel and the auxiliary channel is granted, and to configure one of the transceivers for half-duplex operation when access to only one of the channels is granted, wherein during asymmetrical full-duplex operation, the processing circuitry configures the primary transceiver to communicate data packets using a primary channel and configures the auxiliary transceiver to communicate control packets using an auxiliary channel.

19. The wireless communication system of claim 18, wherein during half-duplex operation, the processing circuitry independently configures one of the transceivers to communicate both data packets and control packets on a same channel.

20. A non-transitory computer-readable storage medium that stores instructions for execution by one or more processors to configure wireless communication device for half-duplex operation and for asymmetrical full-duplex operation on two non-interfering channels, the operations comprising:

configuring a primary transceiver for higher-throughput operation;

configuring an auxiliary transceiver for lower-throughput operation; and coordinating channel access and operations of the primary and auxiliary transceivers with a media-access control (MAC) layer, wherein during asymmetrical full-duplex operation, the MAC layer configures the primary transceiver to communicate data packets using a primary channel and configures the auxiliary transceiver to communicate control packets using an auxiliary channel, and wherein during half-duplex operation, the MAC layer independently configures at least one of the transceivers to communicate both data packets and control packets on the primary channel.

* * * * *